United States Patent Office 3,396,157
Patented Aug. 6, 1968

3,396,157
USE OF ESTERS OF N,N-DIALKYLHYDROXYL-AMINES AND 1-HYDROXYPIPERIDINE FOR THE SYNTHESIS OF PEPTIDES AND OTHER AMIDES
Geoffrey Tyndale Young and Brian Onslow Handford, Oxford, England, assignors to National Research Development Corporation, London, England, a corporation of Great Britain
No Drawing. Filed Sept. 1, 1965, Ser. No. 484,435
Claims priority, application Great Britain, Dec. 1, 1964, 48,881/64
7 Claims. (Cl. 260—112.5)

ABSTRACT OF THE DISCLOSURE

Dialkylhydroxylamine esters, particularly N-hydroxypiperidine esters of α-amino acids or peptides are prepared and used for coupling with other α-amino acids or peptides to produce peptides without loss of optical activity.

---

This invention relates to acylating agents and particularly to acylating agents which can be used for the acylation of amines to form amide or peptide linkages.

In the synthesis of a peptide for example the peptide linkage is formed by reacting a protected amino acid or peptide having a free or activated carboxyl group with a protected amino acid or peptide having a free or activated amino group and such a reaction is repeated several times during the stepwise lengthening of a peptide chain.

The yield is very important in such a repeated reaction and in the case where optically active materials are used, as is commonly the case in peptide chemistry, it is normally required that the reaction should proceed without any change in stereochemical configuration.

Many carboxylic acid derivatives have been proposed for reaction with amino groups to give peptide linkages but only one, the carboxylic acid azide, has been found to react invariably without racemization. This reagent however does not produce the peptide in a particularly good yield and undesirable-by-products may be formed.

It has now been found that peptides can be obtained in good yield, but without racemization under conditions and in cases where, for example, p-nitrophenyl esters would allow racemization if the amino compound is reacted with certain carboxylic acid N,N-disubstituted hydroxylamine esters.

Accordingly the present invention provides carboxylic acid esters of N,N-disubstituted hydroxylamines of the formula $$HO.NR_1R_2$$

where $R_1$ and $R_2$ each represent an alkyl group or together with the nitrogen atom represent a heterocyclic ring, but excluding esters of acetic acid and benzoic acid. The term "carboxylic acid" as used in this specification refers to compounds having a carboxyl group directly bonded to a carbon atom. Thus the esters of the invention may be derived from N,N-dilower-alkylhydroxylamines containing up to 4 carbon atoms in each alkyl group e.g. N,N-dimethyl- or N,N-diethylhydroxylamine, or N,N-disubstituted-alkylhydroxylamines e.g. N,N-dibenzylhydroxylamine or may be derived from the heterocyclic compounds such as N-hydroxypiperidine or N-hydroxypyrrolidine or their C-alkyl substituted homologues.

When the esters are used as acylating agents, a group R.CO is introduced into the compound being acylated. The group R may be any organic group but since the esters find particular application in the peptide field the acid R.COOH from which the esters are derived is preferably an α-amino carboxylic acid which of course, includes α-iminio carboxylic acids or compound containing a peptide linkage, i.e. a polypeptide or a protein. For example the esters of the invention may be derived from any of the α-amino carboxylic acids found in the hydrolysate of or used in the synthesis of naturally occurring polypeptides or proteins, e.g. glycine, alanine, phenylalanine, leucine, proline, histidine, glutamine, asparagine, etc., or from peptide compounds derived from two or more such amino acids. Compounds derived from optically active carboxylic acids are of particular interest. When the esters are to be used in peptide synthesis the free amino group at the end of the chain will normally be protected with a suitable group such as a benzyloxycarbonyl group to prevent the esters undergoing self condensation.

Carboxylic acid esters of the invention may be prepared by reacting a carboxylic acid or a functional derivative thereof with the di-N-substituted-hydroxylamine. For example the free acid may be reacted with the hydroxylamine preferably in equimolecular quantities in the presence of a dehydrating agent, e.g. a carbodiimide such as dicyclohexylcarbodiimide and a solvent such as ethyl acetate or the carboxylic acid halide may be reacted with the di-N-substituted hydroxylamine in the absence of alkali in a solvent such as ether to give the hydrohalide of the ester. Alternatively a mixed anhydride prepared from the acid and, for example ethyl chloroformate, may be reacted with the hydroxylamine to give the ester.

According to a further feature of the invention an amide is prepared by reacting an amine with a carboxylic acid ester of a dialkylhydroxylamine of the formula $$HO.NR_1R_2$$

where $R_1$ and $R_2$ each represent an alkyl group or together with the nitrogen atom represent a heterocyclic ring.

Carboxylic acid esters of these hydroxylamines find particular application in the field of peptide synthesis and according to a preferred feature of the invention a compound containing a peptide linkage is prepared by reacting an N-protected α-amino carboxylic acid or derivative thereof with a dialkylhydroxylamine ester of an α-amino carboxylic acid or carboxylic acid derivative thereof. Such amino acids will normally be naturally occurring amino acids such as those mentioned above and the dialkylhydroxylamine ester will preferably be derived from an optically active acid.

This coupling reaction for peptide synthesis may be carried out under varying conditions of pH but although the reaction mechanism and yield may change when acid conditions are changed through neutral conditions to alkaline conditions the stereochemical configuration is retained. This coupling reaction has the great advantage therefore over previous high yield coupling reactions in that the coupling can take place under a much wider range of conditions.

The reaction is preferably carried out in a water miscible solvent such as dioxan or aqueous dioxan or a water immiscible solvent such as chloroform or ethyl acetate under acid conditions, particularly the mildly acid conditions arising from the addition of acetic acid to the reaction mixture. One convenient method involves carrying out the coupling reaction in the presence of a weak acid having a $pK_a$ in the range 4.5 to 5.5. In other methods in which acid is not added the pH of the reaction mixture is merely that resulting from the mixture of the components. The coupling under these mildly acid conditions or even under neutral conditions proceeds fairly slowly at room temperature producing yields in excess of 90% in 24 hours. This reaction rate can be increased however on moderate heating of the reaction mixture. The protecting groups used in the coupling reaction may be any of those customarily used in this field such as alkoxycarbonyl or aralkoxycarbonyl or trityl groups to protect an amino group and alkyl ester or sodium salt formation to protect a carboxyl group.

The invention is illustrated by the following examples in which amino acids are esterified with N-hydroxypiperidine and the esters coupled with amino acid esters or salts without racemization. The preliminary example describes the preparation of N-hydroxypiperidine. In all the examples temperatures are in °C., M.P. are determined on a Kofler block and specific rotations are determined on an ETL–NPL type 143A automatic polarimeter in a 0.2 dm. tube. $R_f$ values are given in respect of solutions in diethyl ether.

PRELIMINARY EXAMPLE

30% hydrogen peroxide solution (680 ml., 6.0 moles) was added slowly to a gently stirred solution of 1-ethylpiperidine (274 ml., 226 g., 2.0 moles) and ethanol (200 ml.) maintained at ca. 0°. When addition was complete, the resulting solution was left in the cooling mixture and the whole allowed to attain ca. 20°. After approximately the first 12 hr. at the latter temperature, the reaction mixture was removed from the surrounding bath and set aside for a further 5 days. Complete oxidation of 1-ethylpiperidine was indicated by a negative test for amine with phenolphthalein. Excess peroxide was destroyed by the cautious addition of a slurry of platinum black (ca. 0.25 g.) with stirring and cooling (cold water bath) and after ca. 5 hr. the solution gave an almost negative test with acidified potassium iodide-starch paper. The platinum was then removed by filtration and the solution concentrated first at ca. 11 mm. and then at ca. 1 mm. When crystals of the hydrated amine oxide form, the whole was transferred to a three necked, 500 ml. flask with the aid of aqueous ethanol, and evaporation continued at ca. 1 mm. until no more liquid distilled at 90° and an off-white crystalline residue remained. (If slight decomposition of amine oxide around the side of the flask occurred, distillation was stopped.)

For the thermal elimination reaction, the above three necked flask was fitted with a thermometer (to the bottom of the flask), a nitrogen inlet (also to the bottom of the flask), and a wide-bore condenser (to facilitate efficient removal of the large volume of ethylene produced). The temperature of the external bath was raised to ca. 115° and maintained at this temperature while the amine oxide melted. Some decomposition accompanies liquefaction. The latter process complete, the external bath temperature was adjusted for gentle reflux during the first 0.25 hr., moderate reflux for the next 0.5 hr., and more vigorous reflux during a further 0.5 hr. After cooling, the reaction mixture was distilled under nitrogen, employing a 15 cm. Dufton column and an air-condenser and fractions boiling up to and at 84° at 17 mm. collected in receivers cooled to below −30°. The latter fraction was distilled at a faster rate to avoid blockage of the condenser and receiving arm. Towards the end of the distillation, if the slightest trace of pale yellow oil distilled the process was stopped. The main fraction (B.P. 84°/17 mm.) which liquefied to some extent at 20°, was crushed and placed in a large scale sublimation apparatus to form a shallow layer, and three traps at −70° were coupled in series between the sublimation apparatus and the pump. At ca. 20° and $1 \times 10^{-2}$ to $0.5 \times 10^{-2}$ mm., 1-hydroxypiperidine partially sublimed, while practically all other matter distilled out into the traps. Hard crystals of almost pure 1-hydroxypiperidine remained in the sublimation dish. The other low boiling fraction, which was obtained as a liquid at 20°, was treated likewise, bringing the total yield of material of M.P. 38–40° to 109 g., 54%. Crystallization from light petroleum at 0° (essential if the product was to be stored for any length of time) gave needles of M.P. 39–40°.

Example 1.—N-benzyloxycarbonyl-L-leucine 1-piperidyl ester

N-benzyloxycarbonyl-L-leucine (2.65 g., 0.01 mole) and 1-hydroxypiperidine (1.11 g., 0.011 mole) were dissolved in Analar ethyl acetate (50 ml.) and dicyclohexylcarbodiimide (2.06 g., 0.01 mole) added at ca. 20° with stirring. Dicyclohexylurea commenced to separate within 2 minutes. After 6 hours the ethyl acetate solution was filtered, washed with N-hydrochloric acid (2×30 ml.), brine (1×30 ml.), saturated sodium bicarbonate (2×30 ml.) and brine (2×30 ml.) and dried. Removal of the ethyl acetate at room temperature furnished a colorless oil. The ready solubility of this oil in a small volume of ether permitted removal of more dicyclohexylurea. Light petroleum was then added until the solution was just cloudy at ca. 20°, and a spot of ether added to give a clear solution. On standing, translucent, monoclinic crystals of N-benzyloxycarbonyl-L-leucine 1-piperidyl ester separated. Cooling to 0° induced further separation, giving a total yield of 2.90 g., 83%. Recrystallization from the same solvent mixture gave product of M.P. 66–67° C., $[\alpha]_D^{24}$ −10.3° (c. 1.0 in ethyl acetate) $\nu_{max.}$ 1760 cm.$^{-1}$ (in Nujol). (Found: C, 65.3; H, 8.0; N, 8.0. $C_{19}H_{28}N_2O_4$. Requires: C, 65.5; H, 8.1; N, 8.0%.)

Example 2.—N-benzoyl-L-leucine 1-piperidyl ester

N-benzoyl-L-leucine (2.35 g., 0.01 mole) and 1-hydroxypiperidine (2.02 g., 0.02 mole) were dissolved in ethyl acetate (50 ml.) and dicyclohexylcarbodiimide (2.06 g., 0.01 mole) added at 20° with stirring. After 4 hr., the solution was filtered, washed as for the N-benzyloxycarbonyl analogue, dried and evaporated (below 20°) giving a white crystalline residue, 2.83 g., 89%. Crystallization from warm ether gave 1.96 g., 62%, of the title compound M.P. 110–113°. Two further crystallizations from the same solvent gave N-benzoyl-L-leucine 1-piperidyl ester as monoclinic needles, M.P. 112–113.5°, $[\alpha]_D^{25}$ +12.4° (c. 1.0 in ethyl acetate), $\nu_{max.}$ 1755 cm.$^{-1}$ (in Nujol). (Found: C, 67.8; H, 8.0; N, 8.7. $C_{18}H_{26}N_2O_3$. Requires: C, 67.9; H, 8.2; N, 8.8%.)

Example 3.—N-benzyloxycarbonylglycyl-phenylalanine 1-piperidyl ester

N-benzyloxycarbonylglycyl-L-phenylalanine (3.56 g., 0.01 mole), and 1-hydroxypiperidine were treated with dicyclohexylcarbodiimide (2.06 g., 0.01 mole) in ethyl acetate (50 ml.) at 20°. Working up as described for the N-benzyloxycarbonyl-L-leucine 1-piperidyl ester, gave N-benzyloxycarbonylglycyl-phenylalanine 1-piperidyl ester as a colorless oil (3.47 g., 79%), $\nu_{max.}$ 1758 cm.$^{-1}$ (liquid film).

Example 4.—N-benzyloxycarbonyl-glycine 1-piperidyl ester

The procedure described in Example 1 was repeated using 20.9 g., (0.01 mole) N-benzyloxycarbonyl glycine in place of the L-leucine derivative. The product (needles from carbon tetrachloride, 2.42 g., 83%) had M.P. 113–114°. (Found: C, 61.7; H, 7.2; N, 9.6. $C_{15}H_{20}N_2O_4$. Required: C, 61.6; H, 6.9; N, 9.6%.)

Example 5.—N-benzyloxycarbonyl-L-phenylalanine 1-piperidyl ester

The procedure described in Example 1 was repeated using 2.99 g., (0.01 mole) N-benzyloxycarbonyl-L-phenylalanine in place of the L-leucine derivative. 2.75 g., (72%) of the title compound was recovered and crystallized from ethyl acetate/light petroleum to give crystals M.P. 69.5–71°, $[\alpha]_D^{25}$ +15° (c. 1.0 in chloroform, $[\alpha]_D^{24.5}$ +0.8° (c. 1.0 in ethyl acetate).

Example 6.—N-benzyloxycarbonyl-L-asparagine 1-piperidyl ester

The procedure described in Example 1 was repeated using 2.66 g., (0.01 mole) N-benzyloxycarbonyl-L-asparagine in place of the L-leucine derivative. Precipitation frome ethyl acetate with ether and light petroleum furnished a gel, which was washed with ether and dried (1.50 g., 43%). Thin-layer chromatography on Kieselgel G with acetone showed a small amount of an impurity of $R_f$ 0.72. Reprecipitation gave the title compound as a hygroscopic, white powder of indefinite M.P.

$$[\alpha]_D^{24.5} -12.3°$$

(c. 1.0 ethyl acetate), $[\alpha]_D^{24.5} +0.5°$ (c. 1.0 in chloroform).

Example 7.—N-benzyloxycarbonyl-L-leucylglycine ethyl ester 1.74 g., (0.005 mole) N-benzyloxycarbonyl-L-leucine 1-piperidyl ester (prepared as described in Example 1) was dissolved in 5 ml. dioxan and 0.62 ml. (0.006 mole) glycine ethyl ester and 0.35 ml. (0.006 mole) acetic acid added at 20–23° After about 36 hours the dioxan was removed and an ethyl acetate solution of the residue washed with 2 N-hydrochloric acid, saturated sodium bicarbonate and brine and dried over magnesium sulfate. The residue, obtained by evaporation of the ethyl acetate was crystallized from diisopropyl ether to give the 1.46 g. title compound (84%), M.P. 103–104.5°, recrystallization gave material M.P. 104–5°

$$[\alpha]_D^{23.5} -25.6°$$

(c. 1.0 in ethanol).

Example 8.—N-benzoyl-L-leucylglycine ethyl ester 0.83 g. (0.006 mole) glycine ethyl ester hydrochloride and 0.82 g. (0.006 mole) sodium acetate trihydrate, both finely powdered, were stirred into a solution of 1.59 g. (0.005 mole) N-benzoyl L-leucine 1-piperidyl ester (prepared as described in Example 2) in 10 mls. dioxan at 20–23°. After a reaction time of only 1.75 hours the dioxan was removed and the reaction product washed and dried as described in the previous example. Evaporation of the solvent gave 1.52 g. (95%) of the title compound having M.P. 153–6° and $[\alpha]_D^{25.5} -31.3°$ (c. 1.0 in ethanol). Comparable results were obtained when the glycine ethyl ester hydrochloride and sodium acetate trihydrate were replaced with a mixture of glycine ethyl ester, acetic acid and sodium chloride.

Example 9.—N-benzyloxycarbonyl-L-leucylglycine benzyl ester

The procedure described in Example 7 was repeated using 1.74 g. (0.005 mole) N-benzyloxycarbonyl-L-leucine 1-piperidyl ester, 2.02 g. (0.006 mole) glycine benzyl ester hydrotoluene p-sulfonate and 0.25 g. (0.0006 mole) lithium chloride. After a reaction time of only 1.5 hours 1.70 g. (83%) of the title compound was recovered M.P. 92–93.5° $[\alpha]_D^{25} -23°$ (c. 1.0 in chloroform).

Example 10.—N-benzyloxycarbonyl-L-phenylalanylglycine ethyl ester

The procedure described in Example 7 was repeated using 0.764 g. (0.002 mole) N - benzyloxycarbonyl - L-phenylalanine 1 - piperidyl ester, 0.326 g. (0.0024 mole) glycine ethyl ester hydrochloride and 0.324 g. (0.0024 mole) sodium acetate trihydrate and 2 mls. of dioxan, (reaction time 2 hours). Recrystallization from ethyl acetate/diisopropyl ether gave 0.671 g. (87%) of the title compound M.P. 110–112°. Recrystallization gave material of M.P. 110.5°–112.5° $[\alpha]_D^{25} -15.3°$ (c. 1.0 in ethanol).

Example 11.—N-benzyloxycarbonyl-L-phenylalanyl-L-leucine methyl ester

The procedure described in Example 10 was repeated using 0.434 g. (0.0024 mole) L-leucinemethylester hydrochloride in place of the glycine ester, (reaction time 18 hours). Recrystallization from diisopropyl ether gave 0.711 g. (83%) of the title compound of M.P. 109.5–110.5°, $[\alpha]_D^{25.5} -24.2°$ (c. 1.0 in methanol).

Example 12.—N-benzyloxycarbonyl-L-asparaginylglycine ethyl ester

The procedure described in Example 10 was repeated using 0.698 g. (0.002 mole) N-benzyloxycarbonyl-L-asparagine 1-piperidyl ester in place of the phenylalanine ester and using 4 mls. dioxan (reaction time 2 hours). Crystallization from acetone gave 0.451 g. (64%) of the title compound of M.P. 183–184.5°, $[\alpha]_D^{20.5} -12.7°$ (c. 1.0 dimethylformamide).

Example 13.—N-benzyloxycarbonylglycyl-phenylalanine 1.46 g. (0.005 mole) powdered N-benzyloxycarbonylglycine 1-piperidyl ester was stirred into a solution of 0.99 g. (0.006 mole) phenylanine in 6 mls. N-sodium hydroxide, 4 mls. water and 15 mls. dioxan at 20–23°. After 15 hours reaction time the dioxan was substantially removed, the solution diluted with water and washed with ethyl acetate. An ethyl acetate extract of the acidified (pH 2) aqueous phase was washed with brine and dried over magnesium sulfate. The solvent was finally removed to give 1.27 g. (71%) of the title compound which was recrystallized from ethyl acetate/diisopropyl ether, M.P. 127.5°–128.5°, $[\alpha]_D^{24.5} +37.1°$ (c. 1.0 in ethanol).

Example 14.—N-benzoyl-L-leucylglycine

The procedure described in Example 13 was repeated using 1.59 g. (0.005 mole) N - benzoyl - L - leucine 1-piperidyl ester and 0.45 g. (0.006 mole) glycine. After a reaction time of 24 hours 1.35 g. (92%) of the title compound was recovered in the form of a glass, $$[\alpha]_D^{25} -24.9°$$

(c. 1.0 in ethanol). A 2% solution of the product in water deposited, as the first crystalline fraction after 10 weeks, N-benzoyl-L-leucylglycine of M.P. 135.5–136°, $[\alpha]_D^{23} -27.5°$ (c. 1.0 in ethanol).

Example 15.—O-(benzyloxycarbonylglycyl)-N,N-diethylhydroxylamine

A solution of benzyloxycarbonylglycyl chloride was prepared by the reaction of benzyloxycarbonylglycine (10.5 g.) in dry ether at −10° with phosphorus pentachloride, according to the method of Bergmann and Zervas (Ber., 1932, 65, 1192) except that the phosphorus oxychloride was removed by washing the ether solution (cooled by adding solid carbon dioxide) rapidly with ice-water, and the ether solution was then dried (MgSO₄, 5 min.). To this solution (55 ml.) at 0° was added slowly with stirring a solution of diethylhydroxylamine (4.5 g.) in dry ether (50 ml.). An oil separated; after 10 min. the reaction mixture was poured into a separating funnel containing saturated aqueous sodium charbonate (100 ml.) and ethyl acetate (100 ml.); the oil in the reaction vessel was washed into the funnel with aqueous sodium carbonate and with ethyl acetate. The organic layer was separated and washed with saturated aqueous sodium carbonate, brine, N-hydrochloric acid, and brine, and then dried (MgSO₄). Evaporation gave a solid residue (14.g.) which was recrystallized twice from diisopropyl ether to give the title compound M.P. 85–87°. (Found: C, 59.9; H, 7.25; N, 9.6. $C_{14}H_{20}N_2O_4$. Requires: C, 60.0; H, 7.1; N, 10.0%.)

This ester was coupled with glycine ethyl ester in the presence of acetic acid by the procedure described in Example 7 to give the dipeptide, N - benzyloxycarbonylglycylglycine ethyl ester M.P. 78–80° in 81% yield.

Example 16.—O-(phthaloylglycyl)-N,N-dimethylhydroxylamine

To a solution of dimethylhydroxylamine hydrochloride (6.0 g.) and triethylamine (16.6 ml.) in dichloromethane (200 ml.) was added a solution of phthaloylglycyl chloride (13.4 g.) in dichloromethane (150 ml.) with stirring. After 20 min. the solution was washed with water, N-hydrochloric acid, saturated aqueous sodium hydrogen carbonate, and brine, and was then dried ($MgSO_4$). Evaporation gave the ester as a white solid which was recrystallized from diisopropyl ether to give the ester of M.P. 107–110° (12.5 g., 84%); a further crystallization gave the title compound M.P. 111–112°, $\nu_{max}$ (in liquid paraffin) 1765, 1755, 1710 cm.$^{-1}$. (Found: C, 58.05; H, 5.2; N, 11.3. $C_{12}H_{12}N_2O_4$. Requires: C, 58.1; H, 4.8; N, 11.3%.) This ester was coupled with glycine ethyl ester in the presence of acetic acid by the procedure described in Example 7 to give the dipeptide, N-phthaloylglycylglycine ethyl ester M.P. 195–197° in 81% yield.

Example 17.—O-(phthaloylglycyl)-N,N-dibenzylhydroxylamine

The procedure described in Example 15 was modified by slowly adding a solution of N,N-dibenzylhydroxylamine (4.26 g., 0.02 mole) and triethylamine (2.7 ml., 0.02 mole) in dichloromethane to a solution of phthaloylglycyl chloride (4.49 g., 0.02 mole) in dichloromethane. After stirring at 20° for 20 min. the solution was washed with saturated aqueous sodium carbonate, N-hydrochroloic acid, and brine, and dried. Evaporation left chromatographically pure product of M.P. 135–137° (7.85 g., 98%). Two recrystallizations from isopropanol gave one from methanol gave the ester of M.P. 141–142°, $\nu_{max}$ 1735, 1768 cm.$^{-1}$ (in $CCl_4$). (Found: C, 72.1; H, 5.1; N, 7.1. $C_{24}H_{20}N_2O_4$. Requires: C, 72.0; H, 5.0; N, 7.0%.)

The ester was coupled with glycine ethyl ester in the presence of acetic acid by the procedure described in Example 7 to give dipeptide O-phthaloylglycylglycine ethyl ester M.P. 193–194° in 87% yield.

Example 18.—Benzyloxycarbonyl-L-valine 1-piperidyl ester

To a solution of benzyloxycarbonyl-L-valine (0.05 mole) and triethylamine (0.05 mole) in 100 mls. dry dichloromethane at −5° was added dropwise with stirring over 5 minutes a solution of 0.05 mole ethyl chloroformate in 5 mls. dichloromethane. After 15 minutes 0.07 mole 1-hydroxypiperidine in 50 ml. dichloromethane was added. After 2 hours the solution was washed with water, 2 N-hydrochloric acid, aqueous sodium hydrogen carbonate, washed and dried. A chromatographically pure syrup was obtained which was crystallized by cooling to −60° and triturating with ether-light petroleum. The product (72% yield) was recrystallized from diisopropyl ether-like petroleum to give the ester of M.P. 46–47°, $R_f$ 0.53, $[\alpha]_D^{21.5}$ −3.4° (c. 1.0 in EtOAc), $[\alpha]_D^{21.5}$ −13.9° (c. 1.0 in $HCO.NMe_2$), $\nu_{max}$ 1764 cm.$^{-1}$ (in $CHCl_3$). (Found: C, 64.3; H, 7.5; N, 8.6. $C_{18}H_{26}N_2O_4$. Requires: C, 64.6; H, 7.85, N, 8.4%.)

The ester was coupled with glycine ethyl ester in the presence of acetic acid by the procedure described in Example 7 using dioxan as solvent to give the dipeptide, benzyloxycarbonyl-L-valylglycine ethyl ester, M.P. 165–166°, $[\alpha]_D^{21}$ −25.3° (c. 1.0 in ethanol) in 92% yield.

Example 19.—N-benzyloxycarbonyl-S-benzyl-L-cysteine 1-piperidyl ester

The procedure described in Example 1 was repeated using 0.01 mole benzyloxycarbonyl-S-benzyl-L-cysteine, 0.011 mole 1-hydroxypiperidine and 0.01 mole, dicyclohexylcarbodiimide in ethyl acetate as solvent. 65% yield of product M.P. 70–74°, was recovered, which after three recrystallizations from diisopropyl ether gave the ester of M.P. 72–73°, $[\alpha]_D$ −32.1° (c. 1.0 in EtOAc) $R_f$ 0.81, $\nu_{max}$ 1760 cm.$^{-1}$ (in $CHCl_3$). (Found: C, 64.2; H, 6.6; N, 6.2; S, 7.6. $S_{23}H_{29}N_2O_4S$. Requires: C, 64.3; H, 6.8; N, 6.5; S, 7.5%.)

The ester was coupled with glycine ethyl ester in the presence of acetic acid by the procedure described in Example 7 using ethyl acetate as solvent to give the dipeptide N-benzyloxycarbonyl-S-benzyl-L-systeinylglycine ethyl ester in 84%. Yield, M.P. 98–99° (recrystallized from diisopropyl ether), $[\alpha]_D^{22}$ −30.9° (c. 6.0 in acetic acid).

Example 20.—Benzyloxycarbonylglycylglycine 1-piperidyl ester

The mixed anhydride procedure described in Example 18 was repeated using benzyloxycarbonylglycylglycine in place of benzyloxycarbonyl-L-valine and chloroform in place of dichloromethane as solvent. The reaction mixture was left overnight, and evaporation yielded a syrup which rapidly crystallized and was triturated with light petroleum, giving a chromatographically pure product of M.P. 106–108° (47% yield). Recrystallization from methanol and then from isopropanol gave the ester of M.P. 110–111°, $R_f$ 0.05, $\nu_{max}$ 1770 cm.$^{-1}$ (in paraffin paste). (Found: C, 58.5; H, 6.75; N, 11.6. $C_{17}H_{23}N_3O_5$. Requires: C, 58.5; H, 6.65; N, 12.0%.)

The ester was coupled with glycylglycine ethyl ester hydrochloride in the presence of sodium acetate trihydrate using dioxan as solvent by the procedure described in Example 8 to give the tetrapeptide benzyloxycarbonylglycylglycylglycylglycine ethyl ester in 79% yield, M.P. 210–212° (recrystallized from water.)

Example 21.—O-(benzyloxycarbonyl-L-leucyl)-N,N-dimethylhydroxylamine

The mixed anhydride procedure described in Example 18 was repeated using benzyloxycarbonyl-L-leucine in place of the valine derivative and dimethylhydroxylamine hydrochloride in place of 1-hydroxypiperidine. An oil was recovered which was crystallized from diisopropyl ether to give a product of M.P. 63.5–64.5° (yield 65%). Recrystallization from diisopropyl ether gave the ester of M.P. 65–66°, $[\alpha]_D^{23}$ −11.9° (c. 1.0 in EtOAc), $[\alpha]_D^{25}$ −22.8° (c. 1.0 in $HCO.NMe_2$), $\nu_{max}$ 1765, 1730 cm.$^{-1}$ (in $CCl_4$). (Found: C, 62.2; H, 7.6; N, 9.1. $C_{16}H_{24}N_2O_4$. Requires: C, 62.3; H, 7.8; N, 9.1%.)

This ester was coupled with glycine ethyl ester in the presence of acetic acid using ethyl acetate as solvent by the procedure described in Example 7 to give the dipeptide, benzyloxycarbonyl-L-leucylglycine ethyl ester, M.P. 101–102°, in 88% yield.

Example 22.—Phthaloylglycine 1-piperidyl ester

To 1-hydroxypiperidine (4.0 g., 0.04 mole) in dry ether (200 ml.) at 0° was added over 2 min. with stirring a solution of recrystallized phthaloylglycyl chloride (6.2 g., 0.023 mole) in ether (100 ml.). The hydrochloride of the ester precipitated immediately. After stirring for 5 min. more, the suspension was shaken with saturated aqueous sodium carbonate (100 ml.), and the ether layer was separated. The aqueous layer was extracted again with ether (100 ml.), the combined ether extracts were dried and evaporated, leaving a pale yellow syrup. Addition of dry ether (70 ml.) gave a white crystalline product (5.7 g., 75%) of M.P. 94–96°; recrystallization from ether gave the ester of M.P. 97–98°, $\nu_{max}$ 1769, 1729 cm.$^{-1}$, $R_f$ 0.46). (Found: C, 61.8; H, 5.6; N, 9.5%. $C_{15}H_{16}N_2O_4$. Requires: C, 62.2; H, 5.6; N, 9.7%.)

To phthaloylglycine 1-piperidyl ester (1.37 g. in purified dioxan (30 ml.) was added glycylglycine ethyl ester hydrochloride (1.7 g., finely powdered) and sodium acetate trihydrate (0.82 g., finely powdered) and the mixture was shaken for 14 hr. at ca. 23°. The dioxan was removed at 15 mm./30° in a rotary evaporator and the solid residue was washed with water, 2 N-hydrochloric acid, and then dried. Recrystallization from boiling dry ethanol gave needles of the tripeptide, phthaloylglycylglycylglycine ethyl ester M.P. 230–231° (0.98 g., 56%).

Example 23.—Benzyloxycarbonylglycyl-L-tyrosine ethyl ester

Benzyloxycarbonylglycine 1-piperidyl ester (prepared as described in Example 4) is coupled with L-tyrosine ethyl ester hydrochloride in the presence of sodium acetate trihydrate using dioxan as solvent by the procedure described in Example 8 to give the dipeptide title compound in 76% yield, M.P. 126°, $[a]_D^{22}+16.6°$ (c. 5.0 in ethanol).

Example 24.—Benzyloxycarbonyl-β-cyano-L-alanine 1-piperidyl ester

Benzyloxycarbonyl-β-cyano-L-alanine (2.31 g.) and 1-hydroxy-piperidine (1.5 g.) were dissolved in 50 mls. ethyl acetate and cooled to 0° with stirring; dicyclohexylcarbodiimide (2.05 g.) in 20 mls. ethyl acetate was added dropwise during 5 minutes and after a further 2 hours the 1-piperidyl ester was isolated as an amorphous white solid, $R_f$ 0.42 $\nu_{max}$. 2245 (weak) 1760, 1720 cm.$^{-1}$ (in chloroform). 0.005 mole of this ester was used to acylate 0.006 mole benzylamine in 15 mls. ethyl acetate to give 95% yield benzyloxycarbonyl - β - cyano - L-alanine-N-benzyl-amide, M.P. 136–137°.

Example 25.—1-phenylacetoxypiperidine 1-hydroxypiperidine (10.1 g.; 0.1 mol.) and phenyl-acetic acid (13.6 g.; 0.1 mol.) were dissolved in ethyl acetate (500 ml.). The solution was colled to 0°, and dicyclohexylcarbodiimide (20.6 g.; 0.1 mol.) was slowly added, with stirring. The reaction mixture was then allowed to attain room temperature and mechanically stirred for four hours. The dicyclohexylurea which had separated out was filtered off, and the filtrate was washed twice with 2 N hydrochloric acid (100 ml.), once with brine (100 ml.), twice with saturated sodium bicarbonate solution (100 ml.) and finally dried. The solution was then evaporated at room temperature, leaving a colorless oil from which a white solid was obtained by triturating with ether; the crude product was then recrystallized from light petroleum (B.P. 40–60°), as long colorless needles. Yield 20.1 g. (92%), M.P. 29.5–30.5°. (Found: C, 70.89; H, 6.48; $C_{13}H_{28}NO_2$. Requires: C, 71.3; H, 7.8; N, 6.4) $\nu_{max}$. 1765 cm.$^{-1}$.

Coupling of 1-phenylacetoxypiperidine with benzyl-amine.—1-phenylacetoxypiperidine (0.44 g.; 0.002 mol.) was dissolved in chloroform (10 ml.) and benzylamine (0.32 g.; 0.003 mol.) was added. Chromatograms of the solution were taken after intervals of 1, 5, and 15 hours, in order to follow the reaction. These were compared with test plates of the ester ($R_f$ 0.70. After 1 hour a spot due to the product ($R_f$ 0.81) had appeared, and this had completely replaced the piperidyl ester after 15 hours. More chloroform (20 ml.) was added, and the solution was washed twice with 2 N hydrochloric acid (10 ml.), once with saturated potassium bicarbonate solution (10 ml.) and once with water (5 ml.). It was finally dried, and then the chloroform was removed on a rotary evaporator, leaving a white solid (0.39 g.), M.P. 102–104°. This was recrystallized from aqueous ethanol to give needles of N-benzyl-1-phenylacetamide. Yield 0.38 g. (87%), M.P. 116–1170. Further recrystallization improved the M.P. to 117.5–118.5°.

We claim:
1. A process for the preparation of a peptide in which dialkylhydroxylamine ester of the formula:

$$R—COONR_1R_2$$

wherein R is the N-protected organic residue of an a-amino carboxylic acid found in the hydrolysate of naturally occurring peptides or a peptide derived from such a-amino acids, and $R_1$ and $R_2$ each is a lower alkyl group or together with the nitrogen atom form a 5- or a 6-member heterocyclic ring, is reacted with an a-amino carboxylic acid or salt or ester thereof.

2. A process according to claim 1 in which a 1-hydroxy piperidyl ester of an N-protected a-amino carboxylic acid is reacted with an a-amino carboxylic acid or a salt or ester thereof.

3. A process according to claim 1 in which both reactants are derived from an α-amino carboxylic acid found in the hydrolysate of naturally occurring peptides or proteins or a peptide containing at least 2 such amino acid units.

4. A process according to claim 1 in which the dialkyl-hydroxylamine ester is derived from an optically active α-amino carboxylic acid.

5. A process according to claim 1 in which the reaction is carried out under acidic conditions.

6. A process according to claim 5 in which the reaction is carried out in the presence of a weak acid having $pK_a$ in the range 4.5 to 5.5.

7. A carboxylic acid ester of 1-hydroxypiperidine selected from the group consisting of N-benzyloxycarbonyl-L-leucine 1-piperidyl ester,
N-benzyloxycarbonylglycyl-phenylalanine 1-piperidyl ester,
N-benzyloxycarbonyl-glycine 1-piperidyl ester,
N-benzyloxycarbonyl-L-phenylalanine 1-piperidyl ester,
N-benzyloxycarbonyl-L-asparagine 1-piperidyl ester,
N-benzyloxycarbonyl-L-valine 1-piperidyl ester,
N-benzyloxycarbonyl-S-benzyl-L-cysteine 1-piperidyl ester and
N-benzyloxycarbonyl-glycylglycine 1-piperidyl ester.

References Cited

UNITED STATES PATENTS 3,317,559   5/1967   Anderson _____ 260—326.3

FOREIGN PATENTS 169,536   3/1965   U.S.S.R.

OTHER REFERENCES

Beaumont et al.: Acta Chim. Acad. Sci. Hung. 44, 37 (1965).
Handford et al.: J. Chem. Soc. 1965, 6814–6827.
Weygand et al.: Z. Naturforsch 210, 325–331 (1966).
Berlin et al.: Cited in Chem. Abst. 39, 2284 (1945).
Bittner et al.: Tetrahedron Letters, 1965, pp. 95–99.
Gambarjan: Chem. Berichte 58B, 1885–8 (1925).
Mitin et al.: Cited in Chem. Abst. 60, 7951 (1964).
Nefkens et al.: J. Am. Chem. Soc. 83, 1263 (1961).

LEWIS GOTTS, Primary Examiner.

M. M. KASSENOFF, Assistant Examiner.